United States Patent
Xie et al.

(10) Patent No.: US 9,495,082 B2
(45) Date of Patent: Nov. 15, 2016

(54) SERVICE IN SUPPORT OF BROWSER FOR MULTI-MEDIA CONTENT

(75) Inventors: Danming Xie, Shanghai (CN); Juan Zhao, Shanghai (CN); Jieke Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 13/995,942

(22) PCT Filed: Dec. 29, 2011

(86) PCT No.: PCT/CN2011/084896
§ 371 (c)(1),
(2), (4) Date: Feb. 6, 2014

(87) PCT Pub. No.: WO2013/097136
PCT Pub. Date: Jul. 4, 2013

(65) Prior Publication Data
US 2014/0143689 A1    May 22, 2014

(51) Int. Cl.
*G06F 3/00* (2006.01)
*G06F 9/44* (2006.01)
(Continued)

(52) U.S. Cl.
CPC .......... *G06F 3/0484* (2013.01); *G06F 9/4443* (2013.01); *G06F 9/44526* (2013.01); *G06F 17/30896* (2013.01)

(58) Field of Classification Search
CPC .................................................. G06F 3/0484
(Continued)

(56) References Cited

U.S. PATENT DOCUMENTS 6,745,368 B1   6/2004 Boucher et al.
7,234,113 B1   6/2007 Matz et al.
(Continued)

FOREIGN PATENT DOCUMENTS

CN    102246146 A    11/2011
CN    102254292 A    11/2011

OTHER PUBLICATIONS

International Search Report and Written Opinion mailed Oct. 4, 2012 for International Application No. PCT/CN2011/084896, 9 pages.
(Continued)

*Primary Examiner* — Timothy A Mudrick
(74) *Attorney, Agent, or Firm* — Schwabe, Williamson & Wyatt, P.C.

(57) ABSTRACT

Methods, apparatuses and storage medium associated with a multi-media service configured to support a browser for rendering multi-media content are disclosed. In various embodiments, a method may include receiving, by the multi-media service of a device, from a render engine of a browser operating on the device, through a browser engine of the browser, multi-media rendering commands associated with rendering the multi-media content on a display unit of the device. The multi-media service may be operating outside the browser. Further, the method may include processing, by the multi-media service in conjunction with a graphics processing unit and/or a media processor of the device, the multi-media rendering commands to render the multi-media content on the display unit, and emitting and returning signals to the render engine, through the browser engine. Other embodiments may be disclosed or claimed.

27 Claims, 4 Drawing Sheets

(51) Int. Cl.
  *G06F 9/46* (2006.01)
  *G06F 13/00* (2006.01)
  *G06F 3/0484* (2013.01)
  *G06F 17/30* (2006.01)
  *G06F 9/445* (2006.01)

(58) Field of Classification Search
  USPC .......................................................... 719/313
  See application file for complete search history.

(56) References Cited

U.S. PATENT DOCUMENTS

| | | |
|---|---|---|
| 2002/0161797 A1* | 10/2002 | Gallo et al. ................ 707/500.1 |
| 2007/0174415 A1 | 7/2007 | Cha et al. |
| 2009/0150759 A1 | 6/2009 | Chung et al. |
| 2010/0013842 A1* | 1/2010 | Green et al. .................. 345/522 |
| 2010/0118038 A1* | 5/2010 | Labour et al. ................ 345/522 |

OTHER PUBLICATIONS

Foreign Search Report mailed Sep. 16, 2014 for Taiwan Patent Application No. 10114367, 13 pages.
International Preliminary Report on Patentability mailed Jul. 10, 2014 for International Application No. PCT/CN2011/084896, 5 pages.
Extended European Search Report mailed Jul. 24, 2015 for European Patent Application No. 11878494.1, 6 pages.
Office Action mailed Jul. 1, 2016 for Chinese Application No. 201180076044.7. 46 pages.

* cited by examiner

SERVICE IN SUPPORT OF BROWSER FOR MULTI-MEDIA CONTENT

CROSS REFERENCE TO RELATED APPLICATIONS

The present application is a national phase entry under 35 U.S.C. §371 of International Application No. PCT/CN2011/084896, filed Dec. 29, 2011, entitled "SERVICE IN SUPPORT OF BROWSER FOR MULTI-MEDIA CONTENT", which designated, among the various States, the United States of America. The Specification of the PCT/CN2011/084896 Application is hereby incorporated by reference.

TECHNICAL FIELD

This application relates to the technical field of data processing, more specifically to methods and apparatuses associated with service in support of browser for multi-media content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in integrated circuit, computing, networking and related technologies have led to increased consumption of multi-media content on computing devices, including mobile computing devices. Often multi-media content are consumed using a browser, and increasingly multi-media content may be high definition (HD) video.

Recently, Hypertext Markup Language (HTML) 5 may be emerging as a widely accepted approach to deliver online multi-media content streaming service. It is expected that most platforms may need to enable hardware acceleration for video decoding and/or graphics processing, in order to smoothly play HD HTML5 videos. However, most prior art browsers have architectures that are generally difficult to modify to enable efficient exploitation of hardware acceleration for video decoding and/or graphics processing.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with a multi-media service configured to support a browser for multi-media content are disclosed. In various embodiments, a method may include receiving, by a multi-media service of a device, from a render engine of the browser operating on the device, through a browser engine of the browser, multi-media rendering commands associated with rendering the multi-media content on a display unit. The multi-media service may be operating outside the browser. Further, the method may include processing, by the multi-media service in conjunction with a graphics processing unit and/or media processor of the device, the multi-media rendering commands to render the multi-media content on the display unit, and emitting and returning signals to the render engine, through the browser engine.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "AM" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
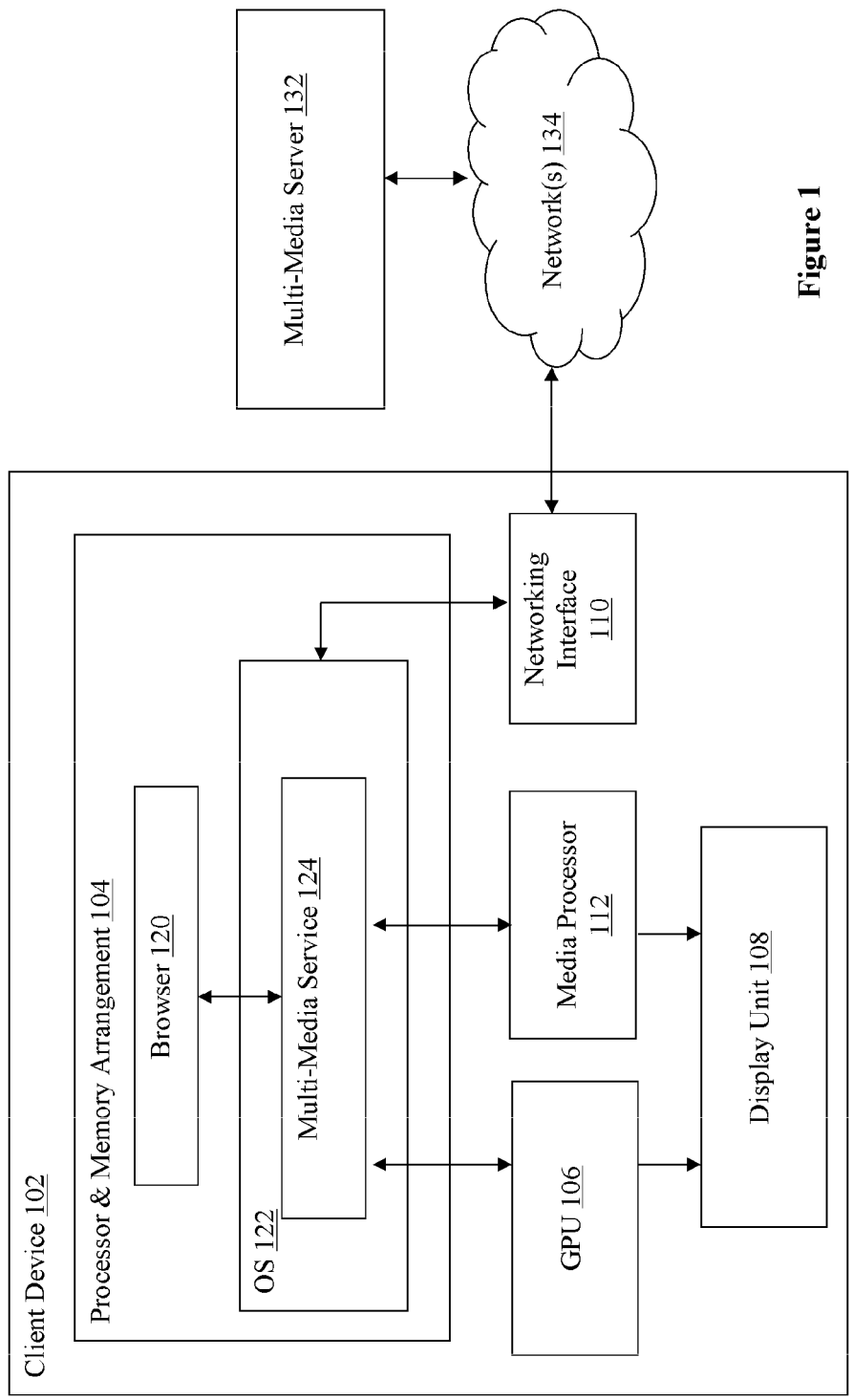
FIG. 1 illustrates an example computing device configured to provide a multi-media service in support of a browser, in conjunction with a graphics processing unit and/or a media processor from outside of the browser, for consuming multi-media content.

FIG. 1 illustrates an example computing device configured to provide multi-media service in support of a browser, in conjunction with a graphics processing unit and/or a media processor, from outside of the browser, in consuming multi-media content, in accordance with various embodiments of the present disclosure. As shown, for the illustrated embodiments, client computing device (or simply, client device) 102 may be coupled with, and receiving multi-media content streamed from multi-media server 132, through network(s) 134. Client device 102 may include processor and memory arrangement 104 configured to have operating system (OS) 122 and browser 120 operated therein, graphics processing: unit 106, media processor 112, display unit 108, and networking interface 110. Further, OS 122 may include multi-media service 124. As will be described in more detail below, multi-media service 124 may be incorporated with teaching of the present disclosure to support browser 120, in conjunction with graphics processing unit 106 and/or media processor 112 and from outside of browser 120, in consuming multi-media content (e.g., streamed from multi-media server 132) on display unit 108. Accordingly, hardware acceleration of video decoding and/or graphics processing may be more easily provided for different platforms with different graphics processing unit and/or a media processor designs, through different implementations of the portions of multi-media service 124 associated with interfacing with the graphics processing unit and/or a media processor.

In various embodiments, as described earlier; processor and memory arrangement 104 may be configured to enable OS 122, including multi-media service 124, and browser 120 to be operated therein. Processor and memory arrangement 104 is intended to represent a broad range of processor and memory arrangement, including but are not limited to arrangements with single or multi-core processors of various execution speeds and power consumptions, and memory of various architectures with one or more levels of caches, and of various types, dynamic random access, FLASH, and so forth.

In various embodiments, graphics processing unit 106 and/or media processor 112 may be configured to provide video decoding and/or graphics processing functions to browser 120, through multi-media service 124, while display unit 108 may be configured to enable multi-media content, e.g., HI) video, to be rendered thereon. Examples of graphics processing functions multi-media service 124 may invoke graphics processing unit 106 and/or media processor 112 to assist may include, but are not limited to, graphics data transformation, lighting processing, triangle set up/clipping, polygon processing, and so forth. In alternate embodiments, graphics processing unit 106 and media processor 112 may be combined in part or in whole.

OS 122 and browser 120 (except for multi-media service 124, and the manner browser 120 and multi-media service 124 cooperate with each other) are intended to represent a broad range of these elements known. Examples of OS 122 may include, but are not limited to, Windows® operating systems, available from Microsoft Corporation of Redmond, Wash., Linux, available from e.g., Red Hat of Raleigh, N.C., Android™, available from Open Handset Alliance, or iOS, developed by Apple Computer of Cupertino. In various embodiments, browser 120 may be a web browser. Examples of browser 120 may include, but are not limited to, Internet Explorer, available from Microsoft Corporation of Redmond, Wash., or Firefox, available from Mozilla of Mountain View, Calif.

Similarly, multi-media server 132 and network(s) 134 are intended to represent a broad range of these elements known. Examples of multi-media server 132 may include, but are not limited to, a video server from Netflix, Inc. of Los Gatos, Calif., or a video server from CNN of Atlanta, Ga. Network(s) 134 may include wired or wireless, local or wide area, private or public networks, including the Internet.

In various embodiments, client device 102 may be a desktop computer, a laptop computer, a tablet computer, a smartphone, a personal digital assistant, a game console, or other devices of the like.

Figure 2:
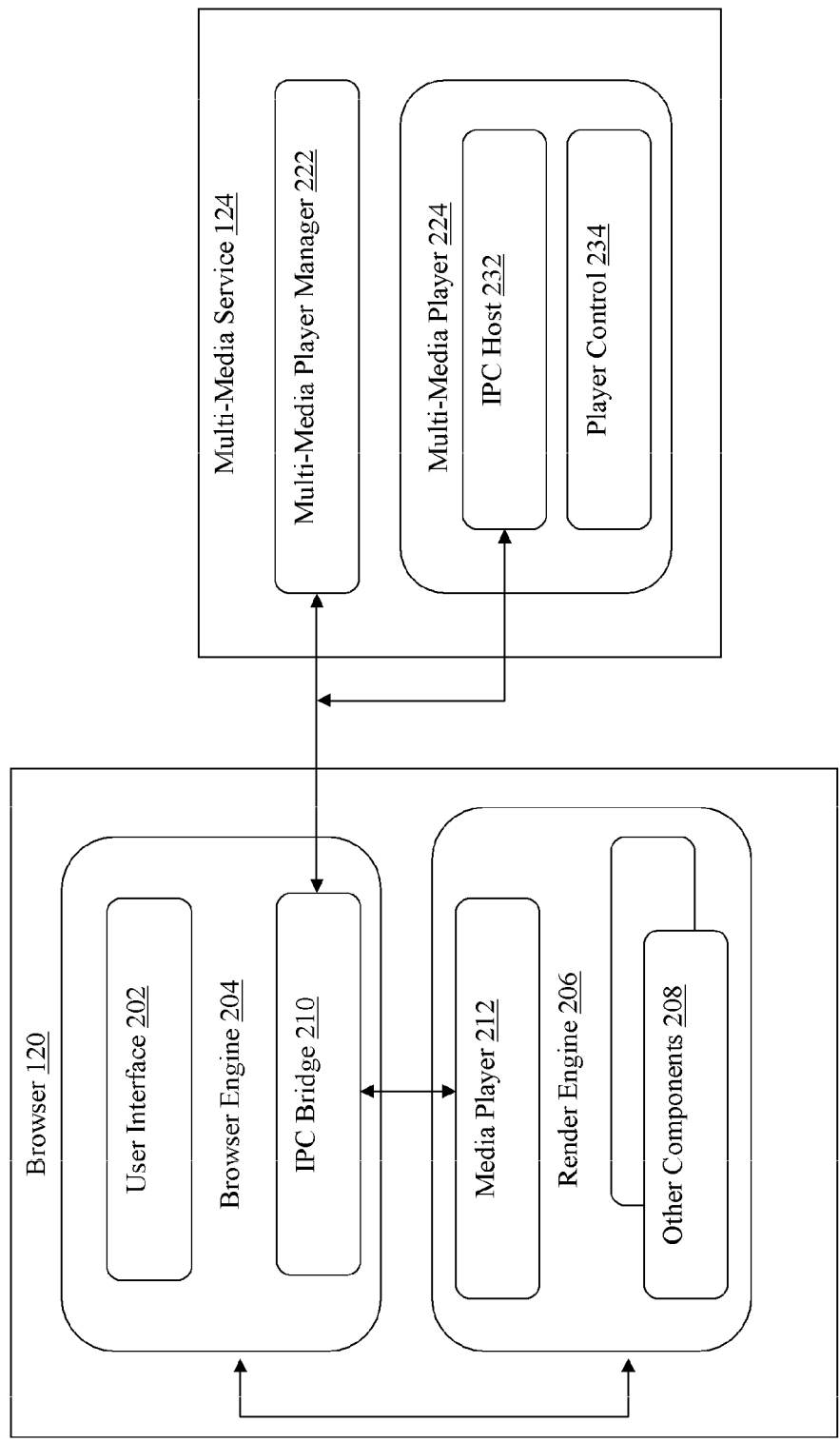
FIG. 2 illustrates example architectures of the browser and the multi-media service of FIG. 1, in further detail.

Referring now to FIG. 2, which illustrates example architectures of browser 120 and multi-media service 124 of FIG. 1, in accordance to various embodiments of the present disclosure. As shown, browser 120 may include browser engine 204 having user interface 202 and inter-process communication (IPC) bridge, and render engine 206 having media player 212 and various other components 208. Examples of various other components 208 may include, but are not limited to, an Extend Markup Language (XML) parser, a JavaScript interpreter, a display interface module, a networking interface module, and so forth. Browser components 202-208 (except for IPC bridge 210, and the manner browser engine 204 and render engine 206 cooperate with multi-media service 124) are intended to represent a broad range of these components known in the art, configured to perform their conventional functions.

In various embodiments, IPC bridge 210 may be configured to enable browser engine 204 to route multi-media content rendering related commands, on behalf of render engine 206, to multi-media service 124. Further, IPC bridge 210 may be configured to enable browser engine 204 to route emitted signals from multi-media service 124 to render engine 206.

In various embodiments, the multi-media content rendering related commands may include:

| | |
|---|---|
| Start | # launch/start media player of multi-media service; |
| Stop | # stop/unload media player of multi-media service; |
| Play | # start to play a multi-media content; |
| Pause | # pause playing of a multi-media content; |
| SetUri | # set uniform resource identifier (uri) of a a multi-media content to be played; |
| SetTarget | # indicate whether playing is direct or indirect rendering; |
| SetPosition | # seek to certain time; |
| SetPlaybackRate | # faster or slower playback; |
| SetVolume | # adjust volume; |
| Set VideoSize | # set video size; |
| GetPosition | # get current video playback time; |
| HasVideo | # query whether the resource identified by the URI contains video; |
| HasAudio | # query whether the resource identified by the URI contains audio; |
| GetPlayerState | # query media player status, paused, initialized, or playing; |
| IsStreaming | # query whether the media content file could be seeked; |
| SupportFullscreen | # query whether the media player can be in fullscreen mode; |
| GetVideoSize | # query video size; |
| GetNaturalVideoSize | # query natural video size property of the media content file; |
| GetBufferedBytes | # query how many bytes have been buffered; |
| GetMediaSizeTime | # query media duration; |
| GetMediaSizeBytes | # query media content file size; |
| GetBufferedTime | # query how many seconds have been buffered. |

In various embodiments, the emitted signals from multi-media service 124 may include:

| | |
|---|---|
| E_SIGNAL_INITIALIZED | # media pipeline is ready in multi-media service; |
| E_SIGNAL_EOF, | # end of multi-media content file/stream; |
| E_SIGNAL_ERROR, | # error happens with error id; |
| E_SIGNAL_BUFFERING, | # media player is buffering to N %; |
| E_SIGNAL_BUFFERED, | # media player finish buffering; |
| E_SIGNAL_SEEKED, | # Actual seek finished, after Seek is called; |
| E_SIGNAL_STOPPED, | # Actual stop finished, after Stop is issued; |
| E_SIGNAL_PLAYSTATECHANGED, | # Play state changed; |
| E_SIGNAL_NEEDREPLY, | # Please send a reply to indicate you are alive. |

Still referring to FIG. 2; for the illustrated embodiments, multi-media service 124 may include multi-media player manager 222 and multi-media player 224. In various embodiments, multi-media player manager 222 may be configured to manage the life-cycle of multi-media player 224, including the launching and unloading of multi-media player 224 (e.g., in response to the "start" and "stop" multi-media content rendering related commands). In various embodiments, multi-media player manager 222 may be configured to manage multiple multi-media players 224 at the same time, to concurrently play multiple multi-media contents. In various embodiments, multi-media player 224 may be configured to support playing of a multi-media content, in conjunction with graphics processing unit 106 and/or media processor 112. In various embodiments, multi-media player 224 may include IPC Host 232 and Player Control 234. IPC Host 232 may be configured to receive multi-media content rendering related commands from render engine 206, and transmit signals emitted by player control 234 to render engine 206, both through IPC Bridge 210 of browser engine 204. In various embodiments, player control 234 may be configured to process the multi-media content rendering related commands, and render a multi-media content, in conjunction with graphics processing unit 106 and/or media processor 112 (leveraging the processing power of the hardware in video decoding and/or graphics processing, such as video scaling, color conversion and so forth).

Figure 3:
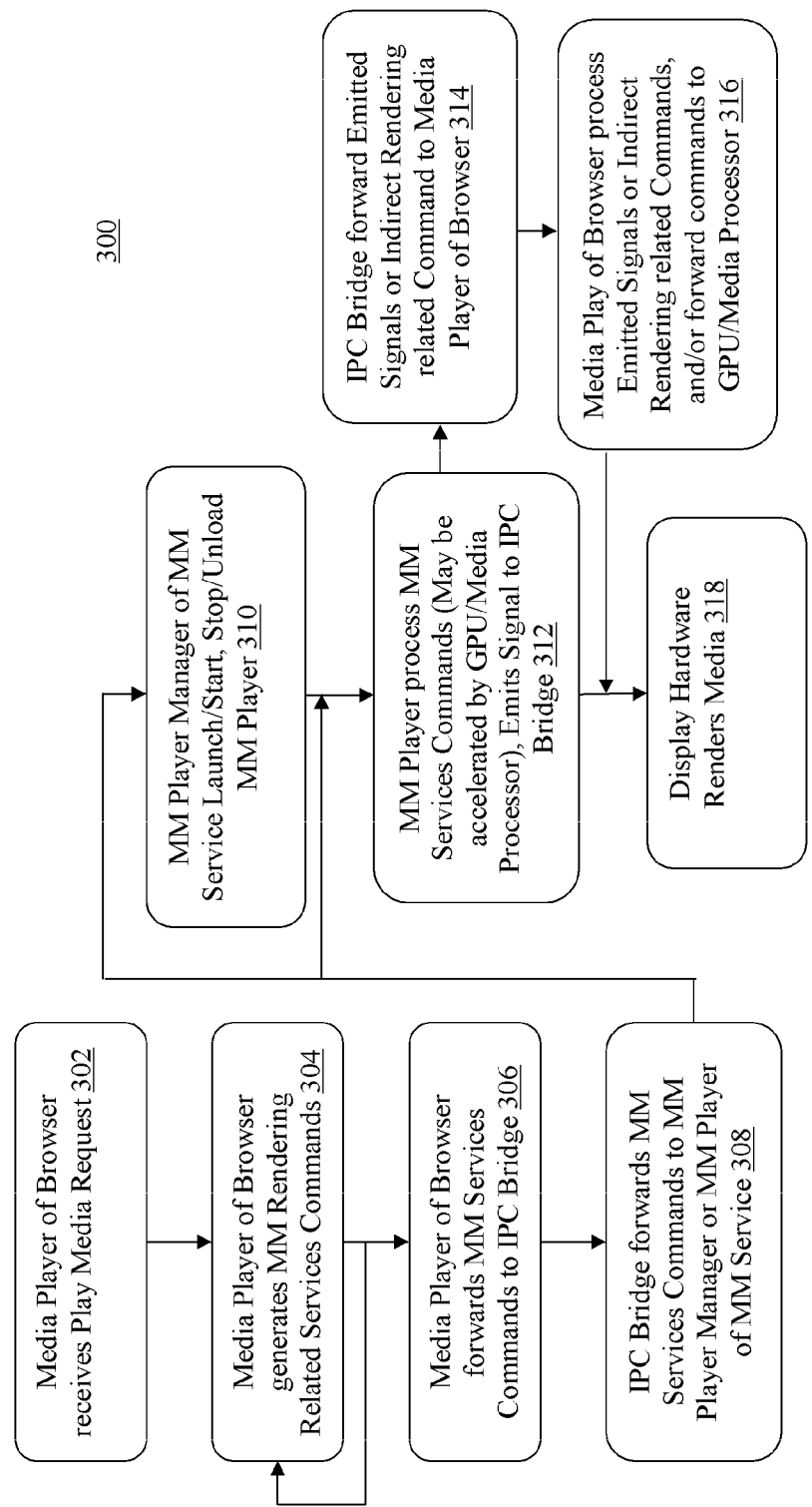
FIG. 3 illustrates a method of operation for the browser and the multi-media service.

FIG. 3 illustrates a method of operation for multi-media service 124 to support browser 120 in rendering a multi-media content, in conjunction with graphics processing unit 106 and/or media processor 112, in accordance with various embodiments of the present disclosure. As shown, method 300 may start at block 302. At block 302, media player 212 of render engine 206 may receive a play media request, e.g., from a user, through user interface 202. From block 302, method 300 may proceed to block 304. At block 304, media player 212 of render engine 206, may in response to the request, generate and issue various multi-media content rendering related service commands, e.g., "start" to start multi-media player 224 of multi-media service 124, "set-URI" to set the URI of a video stream to be played, or "play" to start playing the video stream, and so forth. In various embodiments, method 300 may repeat block 304 to issue various commands over the course of playing a multi-media content.

On issuance of a multi-media content rendering related command (or hereinafter, simply, service commands), method 300 may also proceed from block 304 to block 306. At block 306, media player 212 of render engine 206 may forward the service command to WC bridge 210 of browser engine 204. From block 306, method 300 may proceed to block 308. At block 308, WC Bridge 210 may forward the service command to multi-media player manager 222 of multi-media service 124 if multi-media player 224 of multi-media service 124 have not been launched/started yet or the service command is a multi-media player 224 life-cycle management related command, or to multi-media player 224 of multi-media service 124, in particular IPC host 232, if multi-media player 224 of multi-media service 124 has been launched/started. From block 308; for a multi-media player 224 life-cycle management command, method 300 may proceed to block 310. At block 310, multi-media player manager 222 of multi-media service 124 may process and respond to the service command accordingly, such as launching/starting or stopping/unloading multi-media player 224. From block 308, for a rendering related service command; method 300 may proceed to block 312. At block 312, multi-media player 224 of multi-media service 124 may process and respond to the service command accordingly. For the illustrated embodiments, block 312 may include IPC host 232 processing and routing the commands to player control 234, and receive signals emitted by player control 234 for routing: back to media player 212 of render engine 206, through IPC bridge 210 of browser engine 204. Block 312 may further include player control 234 issuing requests for video decoding and/or graphics processing service requests to graphics processing unit 106 and/or media processor 112 to accelerate the video playback.

For direct rendering (determined by render engine 206), from block 312, method 300 may proceed to block 318. At block 318, display hardware (such as, graphics processing unit 106 and/or media processor 112 with display unit 108), in response to requests made by Player Control 234, may render the multi-media content. For indirect rendering (determined by render engine 206) or for simply routing emitted signals back to media player 212 of render engine 206, from block 312, method 300 may proceed to block 314. At block 314, IPC bridge 210, on receipt of the indirect rendering related service commands or emitted signals, may route the indirect rendering related service commands or the emitted signals to media player 212 of render engine 206, through WC Bridge 210. From block 314, method 300 may proceed to block 316. At block 316, media player 212 of render engine 206, on receipt, may process the indirect rendering related service commands or the emitted signal, and in turn, may issue requests to graphics processing unit 106 and/or media processor 112 to process and render the multi-media content, such as compositing with other HTML elements, rendering video as texture, do image processing to the video snapshots.

Figure 4:
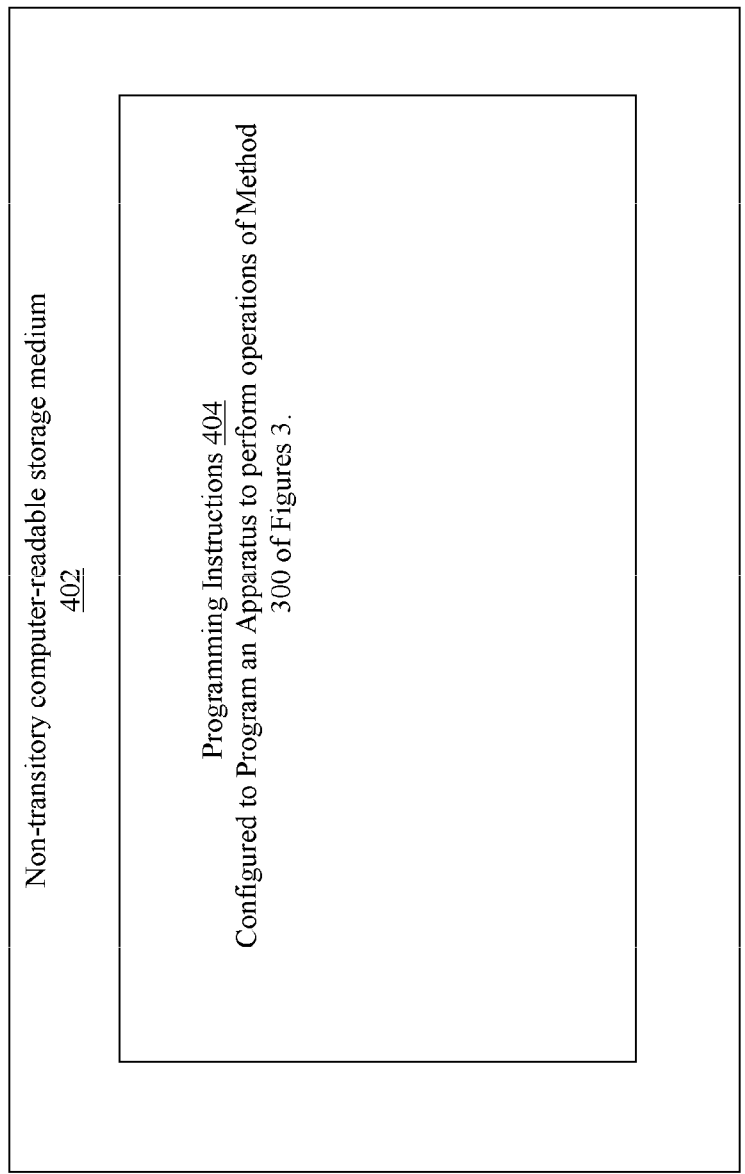
FIG. 4 illustrates an example non-transitory computer-readable storage medium having instructions configured to practice all or selected aspects of the method of FIG. 3; all arranged in accordance with embodiments of the present disclosure.

FIG. 4 illustrates an example non-transitory computer-readable storage medium having instructions configured to practice all or selected aspects of the method of FIG. 3; in accordance with various embodiments of the present disclosure. As illustrated, non-transitory computer-readable storage medium 402 may include a number of programming instructions 404. Programming instructions 404 may be configured to enable a client computing device 102, in response to execution of the programming instructions, to perform all or some of the operations of method 300 earlier described with references to FIG. 3. In alternate embodiments, programming instructions 404 may be disposed on multiple non-transitory computer-readable storage media 402 instead. As described earlier, in various embodiments, the programming instructions may be configured to implement multi-media service 124 or portions thereof.

Referring back to FIG. 1, for one embodiment; at least one of the processor(s) of processor and memory arrangement 104 may be packaged together with computational logic configured to practice the method of FIG. 3, in whole or in part. For one embodiment, at least one of the processor(s) of processor and memory arrangement 104 may be packaged together with computational logic configured to practice the method of FIG. 3 to form a System in Package (SiP). For one embodiment, at least one of the processor(s) of processor and memory arrangement 104 may be integrated on the same die with computational logic configured to practice the method of FIG. 3. For one embodiment, at least one of the processor(s) of processor and memory arrangement 104 may be integrated on the same die with computational logic configured to practice the method of FIG. 3 to form a System on Chip (SoC). For at least one embodiment, the SoC may be utilized in a smart phone, cell phone, tablet, or other mobile device.

Although specific embodiments have been illustrated and described herein, it will be appreciated by those of ordinary skill in the art that a wide variety of alternate and/or equivalent implementations may be substituted for the specific embodiments shown and described: without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A method comprising:
receiving, by a multi-media service of a device, from a render engine of a browser operating on the device, multi-media rendering commands, the render engine having a media player, wherein the multi-media service operates outside the browser, wherein the multi-media service receives the multi-media rendering commands from the multi-media render engine through a browser engine of the browser, wherein the multi-media rendering commands are associated with rendering a multi-media content on a display unit of the device;
generating by the multi-media service, multi-media content rendering signals, wherein generating comprises processing the multi-media commands, using a graphics processing unit or media processor of the device for at least a part of the processing; and
emitting and returning the generated multi-media content rendering signals, by the multi-media service, back to the render engine of the browser, wherein returning comprises returning the generated multi-media content rendering signals to the render engine of the browser through the browser engine of the browser, and wherein the render engine of the browser uses the returned multi-media content rendering signals to render the multi-media content on the display unit.

2. The method of claim 1, wherein receiving comprises receiving the multi-media rendering commands, by the multi-media service, from the render engine, through an inter-process communication bridge of the browser engine.

3. The method of claim 1, wherein emitting and returning comprises emitting and returning the multi-media content rendering signals, by the multi-media service, to the render engine, through an inter-process communication bridge of the browser engine.

4. The method of claim 1, wherein processing comprises processing the multi-media rendering commands by a player control of a media player of the multi-media service, using the graphics processing unit.

5. At least one non-transitory computer-readable storage medium having a plurality of instructions to cause a device, in response to execution of the instructions by a processor of the device, to:
support a browser of the device with a multi-media service, from outside of the browser, in rendering a multi-media content on a display unit of the device, wherein the multi-media service includes a multi-media player management service and a multi-media player;
wherein the multi-media player management service is to receive, from a render engine of the browser, multi-media rendering start or stop commands, the render engine of the browser having a media player, wherein the multi-media rendering start or stop commands are received through a browser engine of the browser, wherein the multi-media player management service, in response to the multi-media rendering start or stop commands, correspondingly start or stop the multi-media player; and
wherein the multi-media player is to process multi-media rendering commands from the render engine, generate multi-media rendering signals based on the processing to render the multi-media content, and return the multi-media rendering signals to the render engine of the browser, wherein the processing is performed using a graphics processing unit or a media processor of the device for at least a part of the processing, wherein the return of the generated multi-media rendering signals to the render engine of the browser is through the browser engine of the browser; and
wherein the render engine of the browser uses the returned multi-media rendering signals to render the multi-media content on the display unit.

6. The at least one computer-readable storage medium of claim 5, wherein the multi-media player is to receive other multi-media rendering commands, from the render engine, through an inter-process communication bridge of the browser engine.

7. The at least one computer-readable storage medium of claim 5, wherein the multi-media player is to emit and return multi-media rendering signals to the render engine, through an inter-process communication bridge of the browser engine.

8. The at least one computer-readable storage medium of claim 5, wherein the multi-media player includes an inter-process communication host to receive other multi-media rendering commands from the render engine, through the browser engine.

9. The at least one computer-readable storage medium of claim 5, wherein the multi-media player includes an inter-process communication host to emit and return multi-media rendering signals to the render engine, through the browser engine.

10. The at least one computer-readable storage medium of claim 5, wherein the multi-media player includes a player control to process other multi-media commands, using the graphics processing unit, to render the multi-media content.

11. The at least one computer-readable storage medium of claim 5, wherein the multi-media rendering commands comprise one or more of
a start command to launch or start the multi-media player;
a stop command to stop or unload the multi-media player;
a play command to play the multi-media content; or
a pause command to pause playing of the multi-media content.

12. The at least one computer-readable storage medium of claim 5, wherein the multi-media rendering commands comprise a set command to set a uniform resource identifier of the multi-media content to be played, to indicate whether playing of the multi-media content is direct or indirect rendering, to seek to a particular time of the multi-media content, to increase or decrease playback rate of the multi-media content, to increase or decrease audio volume of the multi-media content, to set a window size for playing the multi-media content, or to get a current video playback time of the multi-media content.

13. The at least one computer-readable storage medium of claim 5, wherein the multi-media rendering commands comprise a query command to query whether a resource identified by a uniform resource indicator contains video, to query whether a resource identified by a uniform resource indicator contains audio, to query a current status, to query whether the multi-media content can be seeked, to query whether the multi-media content can be rendered in a full-screen mode, to query video size of the multi-media content, to query how many bytes or seconds of the multi-media content have been buffered, or to query duration or a size of the multi-media content.

14. The at least one computer-readable storage medium of claim 5, wherein the multi-media rendering signals comprise one or more of
- a signal indicating a media pipeline of the multi-media service is ready;
- a signal indicating an end of the multi-media content;
- a signal indicating an error occurred during said processing;
- a signal indicating a percentage of buffering or buffering of the multi-media content completed;
- a signal indicating a requested seek performed on the multi-media content has completed;
- a signal indicating playing of the multi-media content has stopped;
- a signal indicating a play state of the multi-media content has changed; or
- a signal indicating a reply from the render engine is needed.

15. The at least one computer-readable storage medium of claim 5, wherein to process multi-media rendering commands, the multi-media player invokes the graphics processing unit or the media processor to assist in graphics data transformation, lighting processing, triangle set up/clipping, or polygon processing.

16. An apparatus comprising:
- a processor and memory arrangement;
- at least one of a graphics processing unit or a media processor coupled with the processor and memory arrangement;
- a display unit coupled with the processor and memory arrangement; and
- a multi-media service to be operated by the processor and memory arrangement, to support a browser, in conjunction with the at least one of graphics processing unit or media processor, from outside the browser, in rendering a multi-media content on the display unit, wherein the support includes receipt of multi-media rendering commands from a render engine of the browser, the render engine having a media player, the multi-media rendering commands associated with rendering the multi-media content, processing of the multi-media rendering commands using the graphics processing unit or media processor for at least part of the processing, generation of multi-media rendering signals based on the processing to render the multi-media content, and emission and transmission of the multi-media rendering signals to the render engine of the browser, wherein receipt of the multi-media rendering commands from the render engine is through a browser engine of the browser, transmission of multi-media rendering signals to the render engine is also through the browser engine, the browser is also operated by the processor and memory arrangement, and the render engine of the browser uses the returned multi-media rendering signals to render the multi-media content on the display unit.

17. The apparatus of claim 16, wherein the multi-media service is to receive the multi-media rendering commands from the render engine, through an inter-process communication bridge of the browser engine.

18. The apparatus of claim 16, wherein the multi-media service is to emit and transmit the multi-media rendering signals to the render engine, through an inter-process communication bridge of the browser engine.

19. The apparatus of claim 16, wherein the multi-media service comprises a multi-media player having an inter-process communication host to receive the multi-media rendering commands, from the render engine, through the browser engine.

20. The apparatus of claim 16, wherein the multi-media service comprises a multi-media player having an inter-process communication host to emit and transmit the multi-media rendering signals to the render engine, through the browser engine.

21. The apparatus of claim 16, wherein the multi-media service comprises a multi-media player having a player control to process the multi-media rendering commands, in conjunction with the graphics processing unit.

22. The apparatus of claim 16, wherein the multi-media service comprises a multi-media player manager to receive multi-media rendering start or stop commands, and in response to the start or stop commands, correspondingly start or stop a multi-media player of the multi-media service.

23. The apparatus of claim 16, wherein the multi-media rendering commands comprise one or more of
- a start command to launch or start the multi-media player;
- a sop command to stop or unload the multi-media player;
- a play command to play the multi-media content; or
- a pause command to pause playing of the multi-media content.

24. The apparatus of claim 16, wherein the multi-media rendering commands comprise a set command to set a uniform resource identifier of the multi-media content to be played, to indicate whether playing of the multi-media content is direct or indirect rendering, to seek to a particular time of the multi-media content, to increase or decrease a playback rate of the multi-media content, to increase or decrease audio volume of the multi-media content, to set a window size for playing the multi-media content, or to get a current video playback time of the multi-media content.

25. The apparatus of claim 16, wherein the multi-media rendering commands comprise a query command to query whether a resource identified by a uniform resource indicator contains video, to query whether a resource identified by a uniform resource indicator contains audio, to query a current status, to query whether the multi-media content can be seeked, to query whether the multi-media content can be rendered in a full-screen mode, to query video size of the multi-media content, to query how many bytes or seconds of the multi-media content have been buffered, or to query duration or a size of the multi-media content.

26. The apparatus of claim 16, wherein the multi-media rendering signals comprise one or more of
- a signal indicating a media pipeline of the multi-media service is ready;
- a signal indicating an end of the multi-media content;
- a signal indicating an error occurred during said processing;
- a signal indicating a percentage of buffering or buffering of the multi-media content completed;
- a signal indicating a requested seek performed on the multi-media content has completed;
- a signal indicating playing of the multi-media content has stopped;
- a signal indicating a play state of the multi-media content has changed; or
- a signal indicating a reply from the render engine is needed.

27. The apparatus of claim 16, wherein the multi-media service is to invoke the graphics processing unit or the media processor to assist in graphics data transformation, lighting processing, triangle set up/clipping, or polygon processing.

* * * * *